US012643982B2

(12) United States Patent
Fujiwara et al.

(10) Patent No.: US 12,643,982 B2
(45) Date of Patent: Jun. 2, 2026

(54) ROOM-TEMPERATURE-CURABLE ORGANOPOLYSILOXANE COMPOSITION AND ARTICLE

(71) Applicant: SHIN-ETSU CHEMICAL CO., LTD., Tokyo (JP)

(72) Inventors: Akitsugu Fujiwara, Annaka (JP); Shigeki Yasuda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 776 days.

(21) Appl. No.: 17/918,594

(22) PCT Filed: Apr. 2, 2021

(86) PCT No.: PCT/JP2021/014274

§ 371 (c)(1),
(2) Date: Oct. 13, 2022

(87) PCT Pub. No.: WO2021/210421

PCT Pub. Date: Oct. 21, 2021

(65) Prior Publication Data

US 2023/0146278 A1 May 11, 2023

(30) Foreign Application Priority Data

Apr. 16, 2020 (JP) ................................ 2020-073190

(51) Int. Cl.

| | |
|---|---|
| ***C08G 77/16*** | (2006.01) |
| ***C08K 5/5419*** | (2006.01) |
| ***C08K 5/544*** | (2006.01) |
| ***C09D 183/06*** | (2006.01) |
| ***G02F 1/1339*** | (2006.01) |

(52) U.S. Cl.

CPC ............ *C08G 77/16* (2013.01); *C08K 5/5419* (2013.01); *C08K 5/544* (2013.01); *C09D 183/06* (2013.01); *G02F 1/1339* (2013.01); *C08G 2150/00* (2013.01); *C08G 2190/00* (2013.01)

(58) Field of Classification Search

CPC ........................... C08G 77/16; C08G 2150/00; C08G 2190/00; C08G 77/70; C08K 5/5419; C08K 5/544; C09D 183/06; C09D 183/04; G02F 1/1339; C08L 83/04; C08L 83/06; C09K 3/10

See application file for complete search history.

(56) References Cited

U.S. PATENT DOCUMENTS

| | | | | |
|---|---|---|---|---|
| 2004/0082736 A1 | | 4/2004 | Sakamoto et al. | |
| 2004/0181025 A1 | | 9/2004 | Schindler et al. | |
| 2005/0101753 A1 | | 5/2005 | Schindler et al. | |
| 2007/0100111 A1 | | 5/2007 | Stanjek et al. | |
| 2007/0167598 A1 | | 7/2007 | Stanjek et al. | |
| 2023/0279263 A1 | * | 9/2023 | Karabiyik | C09D 5/1675 106/287.1 |

FOREIGN PATENT DOCUMENTS

| | | | | | |
|---|---|---|---|---|---|
| CN | 106634771 A | | 5/2017 | |
| JP | 2002-327115 A | | 11/2002 | |
| JP | 2004-143331 A | | 5/2004 | |
| JP | 2004536957 A | * | 12/2004 | C08L 101/10 |
| JP | 2005-139452 A | | 6/2005 | |
| JP | 2007-99955 A | | 4/2007 | |
| JP | 2007-513203 A | | 5/2007 | |
| JP | 2009-513734 A | | 4/2009 | |
| JP | 2016-204612 A | | 12/2016 | |
| JP | 6319168 B2 | | 5/2018 | |
| WO | WO 2020/189463 A1 | | 9/2020 | |
| WO | WO 2020/209083 A1 | | 10/2020 | |

OTHER PUBLICATIONS

English Machine Translation of JP2016204612 (Year: 2025).*
ExxonMobil Isoparaffin C (Year: 2025).*
English Machine Translation of JP2004536957 (Year: 2025).*
International Search Report for PCT/JP2021/014274 mailed on Jun. 15, 2021.
Written Opinion of the International Searching Authority for PCT/JP2021/014274 mailed on Jun. 15, 2021.

* cited by examiner

*Primary Examiner* — Randy P Gulakowski
*Assistant Examiner* — Holley Grace Hester
(74) *Attorney, Agent, or Firm* — Birch, Stewart, Kolasch & Birch, LLP

(57) ABSTRACT

A room-temperature-curable organopolysiloxane composition comprising (A) an organopolysiloxane resin which contains silanol groups in a specified amount and has a specified molecular weight and a specified three-dimensional net-like structure, (B) a hydrolyzable organosilane compound containing an organooxymethyl group and/or a partial hydrolysis-condensation product thereof, (C) a linear diorganopolysiloxane of which each molecule chain terminal is capped with a silanol group, and (D) a hydrolyzable organosilane containing an amino group and/or a partial hydrolysis-condensation product thereof at specified content ratios can be produced easily and at low cost, and can be formed into a high-hardness cured article or coating film even when a metal compound that can serve as a condensation catalyst is not contained.

9 Claims, No Drawings

ROOM-TEMPERATURE-CURABLE ORGANOPOLYSILOXANE COMPOSITION AND ARTICLE

TECHNICAL FIELD

This invention relates to a room-temperature-vulcanizing (RTV) organopolysiloxane composition giving a cured product or coating film having a high hardness, and more particularly, to a RTV organopolysiloxane composition comprising an organopolysiloxane resin of three-dimensional network structure, which is suited in applications as coating and sealing compositions, especially as coating materials (conformal coating materials) for electric/electronic parts and substrates thereof and sealing materials for liquid crystal display devices.

In particular, it relates to a RTV organopolysiloxane composition of dealcoholization type which is simple to prepare, inexpensive, and consistently curable despite elimination of metal compounds or condensation catalysts, and forms a coating film having a high hardness.

BACKGROUND ART

Because of ease of handling, weather resistance, and superior electric properties, room-temperature-vulcanizing (RTV) silicone rubber compositions which crosslink and cure at room temperature (23° C.±15° C.) with airborne moisture into a silicone elastomer or cured silicone rubber are used in a variety of fields including sealing materials for building members and adhesives in electric/electronic field. Particularly in the electric/electronic field, there is a tendency that RTV silicone rubber compositions of dealcoholization type are used because they are adequate for bonding and coating to (typically resinous) adherends used therein. Also, as coating materials for liquid crystal surroundings and power circuit substrates which recently find rapidly increasing demands, RTV silicone rubber compositions of dealcoholization type are similarly used. These coating materials are satisfactory for their main purposes of insulation and moisture-proofing of electric/electronic circuits, but unsatisfactory in improving material hardness for the purpose of protecting wirings associated with the miniaturization of circuit patterns. Regarding the silicone rubber intended for protection and moisture-proofing of circuit patterns, the following techniques are heretofore known.

JP-A 2004-143331 (Patent Document 1) discloses a RTV organopolysiloxane composition which forms a cured product or coating having high transparency and high strength. An organopolysiloxane consisting of $(CH_3)_3SiO_{1/2}$ units and $SiO_{4/2}$ units in a molar ratio of $(CH_3)_3SiO_{1/2}$ units to $SiO_{4/2}$ units of 0.74 and having a silicon-bonded hydroxy content of 1.62 wt % and both end silanol-capped dimethylpolysiloxane are subjected to condensation reaction at 20° C. for 12 hours with the aid of aqueous ammonia. Such a long reaction time is a problem. Even when the step of removing ammonia by heating is involved, the odor of ammonia is left in the composition, which sometimes gives rise to a practical problem on use.

JP-A 2002-327115 (Patent Document 2) discloses a RTV organopolysiloxane composition having improved moisture-proofness. The RTV organopolysiloxane composition is prepared by dissolving an organopolysiloxane consisting of $(CH_3)_3SiO_{1/2}$ units and $SiO_{4/2}$ units in a molar ratio of $(CH_3)_3SiO_{1/2}$ units to $SiO_{4/2}$ units of 0.74 and having silanol groups at both ends of the molecular chain in toluene to form a resinous copolymer, and adjusting heating conditions. Because of the heating step, the preparation process is not simple, which is a problem.

JP-A 2007-099955 (Patent Document 3) discloses a method for preparing a RTV organopolysiloxane composition which forms a cured product or coating film having a high hardness. A dimethylpolysiloxane consisting of $(CH_3)_3SiO_{1/2}$ units and $SiO_{4/2}$ units in a molar ratio of $(CH_3)_3SiO_{1/2}$ units to $SiO_{4/2}$ units of 0.75, having a silicon-bonded hydroxy content of 1.1 wt % and capped at both ends with silanol groups, and tetramethylguanidine are subjected to condensation reaction at room temperature for 1 hour. The preparation time is shorter than JP-A 2002-327115 (Patent Document 2). Since a highly polar amine compound is used, it is poorly compatible with the organosiloxane composition. Since the amine compound does not directly crosslink with the organopolysiloxane, there is a problem that the amine compound leaches out of the composition.

JP 6319168 (Patent Document 4) discloses a method for preparing a RTV organopolysiloxane composition, having the advantages of ease of preparation and a short tact time. While the RTV composition of dealcoholization type is defined as comprising an organopolysiloxane consisting of $R_3SiO_{1/2}$ units and $SiO_{4/2}$ units and a titanium catalyst, there is a possibility that the composition itself becomes whitened as a result of moisture-promoted hydrolysis because the titanium catalyst is contained. A RTV composition of deacetonation type having vinyltriisopropenoxysilane and tetramethylguanidylpropyltrimethoxysilane blended therein is also described. These silanes are expensive. Since tetramethylguanidylpropyltrimethoxysilane is strongly basic, the composition can react with the flux component used in electric/electronic parts and substrates thereof to form electroconductive salts, with a risk of electric performance being degraded.

PRIOR ART DOCUMENTS

Patent Documents

Patent Document 1: JP-A 2004-143331
Patent Document 2: JP-A 2002-327115
Patent Document 3: JP-A 2007-099955
Patent Document 4: JP 6319168

SUMMARY OF INVENTION

Technical Problem

An object of the invention, which has been made under the above-mentioned circumstances, is to provide a RTV organopolysiloxane composition of dealcoholization type comprising an organopolysiloxane resin of three-dimensional network structure, which is suited as a coating material in the electric/electronic field (especially liquid crystal surrounding and power circuit substrates), which is simple to prepare and inexpensive, and forms a cured product or coating film (conformal coating film) having a high hardness despite omission of metal compounds or condensation catalysts; and an article which is coated or sealed with a cured product of the composition.

Solution to Problem

Making extensive investigations to attain the above object, the inventors have found that a RTV organopolysiloxane composition comprising (A) an organopolysiloxane resin of three-dimensional network structure containing a specific amount of silanol groups and having a specific molecular weight and a specific structure, (B) a hydrolyzable organosilane compound having an organooxymethyl group and/or a partial hydrolytic condensate thereof, (C) a linear diorganopolysiloxane which is capped at both ends of the molecular chain with a silanol group, and (D) a hydrolyzable amino-containing organosilane and/or a partial hydrolytic condensate thereof in a specific proportion is simple to prepare and inexpensive, and forms a cured product or coating film (conformal coating film) having a high hardness despite omission of metal compounds. The invention is predicated on this finding.

Accordingly, the invention provides a RTV organopolysiloxane composition and an article coated or sealed with a cured product of the composition, as defined below.

[1]

A room-temperature-vulcanizing organopolysiloxane composition comprising components (A) to (D):

(A) 100 parts by weight of an organopolysiloxane resin of three-dimensional network structure comprising $R_3SiO_{1/2}$ units and $SiO_{4/2}$ units wherein R is independently an unsubstituted or substituted $C_1$-$C_6$ monovalent hydrocarbon group or hydroxy group, in a molar ratio of $R_3SiO_{1/2}$ units to $SiO_{4/2}$ units of from 0.5 to 1.5, optionally comprising $R_2SiO_{2/2}$ units and $RSiO_{3/2}$ units wherein R is as defined above in an each molar ratio of $R_2SiO_{2/2}$ units to $SiO_{4/2}$ units and $RSiO_{3/2}$ units to $SiO_{4/2}$ units independently of from 0 to 1.0, the resin containing 0.005 to 0.15 mol/100 g of silicon-bonded hydroxy groups or silanol groups, and having a molecular weight of 2,000 to 10,000, (B) a hydrolyzable organosilane compound having the general formula (1):

[Chem. 1]

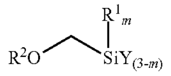

(1)

wherein $R^1$ is independently an unsubstituted or substituted $C_1$-$C_{12}$ monovalent hydrocarbon group, $R^2$ is an unsubstituted or substituted $C_1$-$C_{12}$ monovalent hydrocarbon group, Y is a hydrolyzable group, and m is 0, 1 or 2, and/or a partial hydrolytic condensate thereof in such an amount as to give a molar ratio of component (B) to silanol groups in component (A) of from 0.2 to 1, (C) 10 to 100 parts by weight of a linear diorganopolysiloxane which is capped at both ends of the molecular chain with a silanol group, and (D) 0.5 to 5 parts by weight of an amino group containing hydrolyzable organosilane and/or a partial hydrolytic condensate thereof other than components (A) and (B).

[2]

The room-temperature-vulcanizing organopolysiloxane composition of [1], further comprising (E) an organic solvent having a boiling point of 40 to 180° C., exclusive of benzene, toluene and xylene, in such an amount that the composition may have a non-volatile content of 20 to 80% by weight.

[3]

The room-temperature-vulcanizing organopolysiloxane composition of [1] or [2] which is free of a metal base condensation catalyst.

[4]

The room-temperature-vulcanizing organopolysiloxane composition of any one of [1] to [3] which is used for coating electric/electronic parts and/or substrates thereof.

[5]

The room-temperature-vulcanizing organopolysiloxane composition of any one of [1] to [3] which is used for sealing liquid crystal display devices.

[6]

An article which is coated or sealed with a cured product of the room-temperature-vulcanizing organopolysiloxane composition of any one of [1] to [5].

Advantageous Effects of Invention

The room-temperature-vulcanizing organopolysiloxane composition of dealcoholization type according to the invention is simple to prepare and inexpensive, and forms a cured product or coating film having a high hardness despite omission of metal compounds.

DESCRIPTION OF EMBODIMENTS

Now the invention is described in detail.

[Component (A)]

In the RTV organopolysiloxane composition of condensation reaction cure type comprising an organopolysiloxane resin of three-dimensional network structure according to the invention, component (A) serving as the main component or base polymer is an organopolysiloxane resin of three-dimensional network structure comprising $R_3SiO_{1/2}$ units and $SiO_{4/2}$ units wherein R is independently an unsubstituted or substituted $C_1$-$C_6$ monovalent hydrocarbon group or hydroxy group, in a molar ratio of $R_3SiO_{1/2}$ units to $SiO_{4/2}$ units of from 0.5/1 to 1.5/1, optionally comprising $R_2SiO_{2/2}$ units and $RSiO_{3/2}$ units wherein R is as defined above in an each molar ratio of $R_2SiO_{2/2}$ units to $SiO_{4/2}$ units or $RSiO_{3/2}$ units to $SiO_{4/2}$ units independently of from 0/1 to 1.0/1, the resin containing 0.005 to 0.15 mol/100 g of silicon-bonded hydroxy groups or silanol groups, and having a molecular weight of 2,000 to 10,000.

R is an unsubstituted or substituted $C_1$-$C_6$ monovalent hydrocarbon group or hydroxy group. Examples of the unsubstituted or substituted $C_1$-$C_6$ monovalent hydrocarbon group R include alkyl groups such as methyl, ethyl, propyl, isopropyl, butyl, isobutyl, sec-butyl, tert-butyl, pentyl, and hexyl, cycloalkyl groups such as cyclohexyl, alkenyl groups such as vinyl and allyl, phenyl, and the foregoing groups in which some or all of the hydrogen atoms are substituted by halogen, such as chloromethyl. R is preferably hydroxy, methyl, ethyl, propyl or phenyl, more preferably hydroxy, methyl or phenyl.

In component (A), a molar ratio of $R_3SiO_{1/2}$ units to $SiO_{4/2}$ units is in the range from 0.5 to 1.5, preferably from 0.6 to 1.3, more preferably from 0.65 to 1.2. When this molar ratio is less than 0.5, the cured product is insufficiently reinforcing. When the molar ratio exceeds 1.5, the cured product has an insufficient hardness.

Although the organopolysiloxane resin of three-dimensional network structure as component (A) preferably consists of $R_3SiO_{1/2}$ units and $SiO_{4/2}$ units, the resin may contain $R_2SiO_{2/2}$ units and $RSiO_{3/2}$ units independently in a molar ratio of $R_2SiO_{2/2}$ units to $SiO_{4/2}$ units of from 0 to 1.0 and a molar ratio of $RSiO_{3/2}$ units to $SiO_{4/2}$ units of from 0 to 1.0, more desirably in a molar ratio of from 0 to 0.8.

Also, the organopolysiloxane resin as component (A) should contain 0.005 to 0.15 mol/100 g of silanol groups (i.e., 0.085 to 2.5% by weight calculated as OH of silicon-bonded hydroxy groups), preferably 0.01 to 0.13 mol/100 g (0.17 to 2.2% by weight), more preferably 0.02 to 0.12 mol/100 g (0.3 to 2.0% by weight). When silanol groups are contained more than 0.15 mol/100 g, rubber physical properties (especially hardness) become so high that the composition may crack. When silanol groups are contained less than 0.005 mol/100 g, condensation reaction between components (A) and (C) does not sometimes take place to a full extent, failing to achieve the desired physical properties.

The organopolysiloxane resin of three-dimensional network structure as component (A) should have a molecular weight of 2,000 to 10,000, preferably about 2,500 to 8,000. If the molecular weight is too low, a cured product (cured silicone rubber) of the organopolysiloxane composition has poor rubber elasticity and is liable to fissure. When the molecular weight is too high, it is difficult to prepare a uniform organopolysiloxane composition. The molecular weight (or degree of polymerization) may be determined as a number average molecular weight (or number average degree of polymerization) versus polystyrene standards by gel permeation chromatography (GPC) using toluene or tetrahydrofuran (THF) as developing solvent.

The organopolysiloxane resin as component (A) is obtained from cohydrolysis in an organic solvent of a monofunctional triorganosilane having one hydrolyzable group and a tetrafunctional silane having four hydrolyzable groups and optionally a trifunctional organosilane having three hydrolyzable groups and/or a difunctional diorganosilane having two hydrolyzable groups, followed by condensation. The organopolysiloxane resin is substantially free of volatiles and is a well-known material.

The organic solvent used in cohydrolysis reaction must be one in which the organopolysiloxane resin as component (A) is dissolved. Typical of the organic solvent are aromatic solvents such as toluene and xylene, halogenated solvents such as chloroform and dichloromethane, and hydrocarbon solvents such as cyclohexane, ethylcyclohexane, and isoparaffin.

[Component (B)]

The RTV organopolysiloxane composition contains a hydrolyzable organosilane compound containing a silicon-bonded organooxymethyl group, typically alkoxymethyl group, in the molecule, represented by the general formula (I) and/or a partial hydrolytic condensate thereof as a crosslinking or curing agent. As used herein, the "partial hydrolytic condensate" refers to an organosiloxane oligomer resulting from partial hydrolysis and condensation of the hydrolyzable organosilane compound, and containing at least two, preferably at least three residual hydrolyzable groups in the molecule.

[Chem. 2]

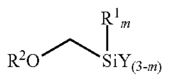

(1)

Herein $R^1$ is independently an unsubstituted or substituted $C_1$-$C_{12}$, preferably $C_1$-$C_8$, more preferably $C_1$-$C_4$ monovalent hydrocarbon group, $R^2$ is an unsubstituted or substituted $C_1$-$C_{12}$, preferably $C_1$-$C_8$, more preferably $C_1$-$C_4$ monovalent hydrocarbon group, Y is a hydrolyzable group, and m is 0, 1 or 2.

In formula (1), examples of the unsubstituted or substituted $C_1$-$C_{12}$, preferably $C_1$-$C_8$, more preferably $C_1$-$C_4$ monovalent hydrocarbon group represented by $R^1$ include alkyl groups such as methyl, ethyl, propyl, isopropyl, butyl, isobutyl, sec-butyl, tert-butyl, pentyl, hexyl, heptyl, octyl, 2-ethylhexyl, nonyl, decyl and dodecyl, cycloalkyl groups such as cyclopentyl and cyclohexyl, alkenyl groups such as vinyl, allyl, propenyl, isopropenyl, butenyl, pentenyl and hexenyl, aryl groups such as phenyl, tolyl, xylyl, α-naphthyl and β-naphthyl, aralkyl groups such as benzyl, 2-phenylethyl and 3-phenylpropyl, and the foregoing groups in which some or all of the hydrogen atoms are substituted by halogen (e.g., F, Cl or Br) or cyano, such as 3-chloropropyl, 3,3,3-trifluoropropyl and 2-cyanoethyl. Inter alia, those groups exclusive of aliphatic unsaturated hydrocarbon groups such as alkenyl groups are preferred, and alkyl groups such as methyl and ethyl are preferred, with methyl being most preferred.

In formula (1), examples of the unsubstituted or substituted $C_1$-$C_{12}$, preferably $C_1$-$C_8$, more preferably $C_1$-$C_4$ monovalent hydrocarbon group represented by $R^2$ include alkyl groups such as methyl, ethyl, propyl, isopropyl, butyl, isobutyl, sec-butyl, tert-butyl, pentyl, hexyl, heptyl, octal, 2-ethylhexyl, nonyl, decyl and dodecyl, cycloalkyl groups such as cyclopentyl and cyclohexyl, alkenyl groups such as vinyl, allyl, propenyl, isopropenyl, butenyl, pentenyl and hexenyl, aryl groups such as phenyl, tolyl, xylyl, α-naphthyl and β-naphthyl, aralkyl groups such as benzyl, 2-phenylethyl and 3-phenylpropyl, the foregoing groups in which some or all of the hydrogen atoms are substituted by halogen (e.g., F, Cl or Br) or cyano, such as 3-chloropropyl, 3,3,3-trifluoropropyl and 2-cyanoethyl, and the foregoing alkyl groups in which some hydrogen atoms are substituted by lower alkoxy (e.g., methoxy and ethoxy) such as methoxymethyl, methoxyethyl, ethoxymethyl and ethoxyethyl. Inter alia, $C_1$-$C_4$ lower alkyl groups such as methyl and ethyl are preferred.

In formula (1), Y is a hydrolyzable group, examples of which include $C_1$-$C_4$ alkoxy groups such as methoxy, ethoxy, propoxy, isopropoxy, butoxy, isobutoxy and tert-butoxy, $C_2$-$C_4$ alkoxyalkoxy groups such as methoxyethoxy, ethoxyethoxy and methoxypropoxy, $C_2$-$C_8$ acyloxy groups such as acetoxy, octanoyloxy and benzoyloxy, $C_2$-$C_6$ alkenyloxy groups such as vinyloxy, propenyloxy, isopropenyloxy and 1-ethyl-2-methylvinyloxy, $C_3$-$C_7$ ketoxime groups such as dimethylketoxime, methylethylketoxime, and diethylketoxime, $C_2$-$C_6$ amino groups such as dimethylamino, diethylamino, butylamino and cyclohexylamino, $C_2$-$C_6$ aminoxy groups such as dimethylaminoxy and diethylaminoxy, $C_3$-$C_8$ amide groups such as N-methylacetamide, N-ethylacetamide, and N-methylbenzamide. Inter alia, alkoxy groups are preferred, with methoxy and ethoxy being most preferred.

The subscript m is 0, 1 or 2, preferably 0 or 1, most preferably 0.

Examples of the hydrolyzable organosilane compound containing a silicon-bonded organooxymethyl group, typically alkoxymethyl group, in the molecule, represented by formula (1) and the partial hydrolytic condensate thereof include methoxymethyltrimethoxysilane, ethoxymethyltriethoxysilane, methoxymethylinethyldimethoxysilane, ethoxymethylmethyldiethoxysilane, methoxymethylethyldimethoxysilane, ethoxymethylethyldiethoxysilane, methoxymethylhexyldimethoxysilane, ethoxymethylhexyldiethoxysilane, methoxymethyloctyldimethoxysilane, ethoxymethyloctyldiethoxysilane, methoxymethylphenyldimethoxysilane, ethoxymethylphenyldiethoxysilane, and partial hydrolytic condensates thereof.

It is noted that of the foregoing exemplary compounds, methoxymethyltrimethoxysilane and ethoxymethyltriethoxysilane have the structural formulae shown below. Inter alia, ethoxymethyltriethoxysilane is most preferred.

[Chem. 3]

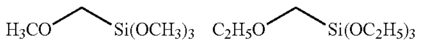

In the RTV organopolysiloxane composition, the hydrolyzable organosilane compound containing an organooxymethyl group and/or the partial hydrolytic condensate thereof as component (B) serves as a crosslinking or curing agent for performing condensation reaction with silanol groups in component (A) or base polymer to form a crosslinked structure. The hydrolyzable organosilane compound and/or the partial hydrolytic condensate thereof as component (B) is preferably blended in such amounts that a molar ratio of component (B) to silanol groups in component (A) may range from 0.2 to 1, preferably from 0.4 to 1. When the amount of component (B) is too small, no satisfactory rubber physical properties are obtained even when the composition is cured, or the composition becomes poor in storage stability. A too large amount of component (B) detracts from fast cure or is uneconomical.

[Component (C)]

Component (C) is an important component for chemically bonding or linking together, through condensation reaction, the organopolysiloxane resin of three-dimensional network structure resulting from condensation reaction of component (A) with component (B) so that the hydrolyzable groups originating from component (B) are introduced at the sites of silanol groups in component (A). Specifically, it is a linear diorganopolysiloxane which is capped at both ends of the molecular chain with a silanol group (or hydroxydiorganosiloxy group), preferably represented by the general formula (2).

[Chem. 4]

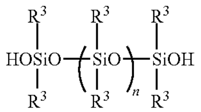

(2)

Herein $R^3$ is independently a $C_1$-$C_{10}$ unsubstituted or alkoxy-substituted monovalent hydrocarbon group and n is an integer of at least 10.

In formula (2), examples of the $C_1$-$C_{10}$ unsubstituted or alkoxy-substituted monovalent hydrocarbon group $R^3$ include alkyl groups such as methyl, ethyl, propyl, isopropyl, butyl, isobutyl, sec-butyl, tert-butyl, pentyl, and hexyl, cycloalkyl groups such as cyclohexyl, alkenyl groups such as vinyl and allyl, aryl groups such as phenyl and naphthyl, and alkoxy-substituted monovalent hydrocarbon groups in which some or all of the hydrogen atoms are substituted by alkoxy, typically alkoxy-substituted alkyl groups such as methoxymethyl, methoxyethyl, ethoxymethyl and ethoxyethyl. Inter alia, methyl is most preferred.

Component (C) is preferably a fluid (or liquid) having a viscosity at 23° C. of up to 10,000 mPa·s (typically 30 to 10,000 rnPa·s), more preferably about 50 to 8,000 mPa·s, even more preferably about 100 to 6,000 mPa·s. Typically, the number (n) of repeat units in formula (2) or degree of polymerization is about 10 to about 1,000, preferably about 30 to about 500, more preferably about 50 to about 400. Notably, the viscosity is typically measured by a rotational viscometer, e.g., BL, BH, BS or cone plate type.

The amount of component (C) blended is 10 to 100 parts by weight, preferably 10 to 80 parts by weight per 100 parts by weight of component (A). When the amount of component (C) is too small, the composition cures, but reaches an extremely high hardness, failing to obtain satisfactory rubber properties. When the amount of component (C) is too large, the desired physical properties are not obtained.

[Component (D)]

Component (D) is a component (or adhesion promoter) for imparting adhesion to the RTV organopolysiloxane composition. It is an amino group containing hydrolyzable organosilane (so-called amino-functional carbon-functional silane or amino-functional silane coupling agent) and/or a partial hydrolytic condensate thereof.

For example, the amino group containing hydrolyzable organosilane has the general formula (3).

[Chem. 5]

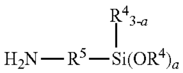

(3)

Herein $R^4$ is independently a $C_1$-$C_{10}$ unsubstituted or alkoxy-substituted monovalent hydrocarbon group, $R^5$ is a $C_2$-$C_{15}$ divalent hydrocarbon group which may contain nitrogen, and "a" is 2 or 3.

In formula (3), examples of the $C_1$-$C_{10}$ unsubstituted or alkoxy-substituted monovalent hydrocarbon group $R^4$ include alkyl groups such as methyl, ethyl, propyl, isopropyl, butyl, isobutyl, sec-butyl, tert-butyl, pentyl, and hexyl, cycloalkyl groups such as cyclohexyl, alkenyl groups such as vinyl and allyl, aryl groups such as phenyl and naphthyl, and alkoxy-substituted monovalent hydrocarbon groups in which some or all of the hydrogen atoms are substituted by alkoxy, typically alkoxy-substituted alkyl groups such as methoxymethyl, methoxyethyl, ethoxymethyl and ethoxyethyl. Inter alia, methyl and ethyl are preferred. $R^4$ may be the same or different.

The subscript "a" is 2 or 3.

In formula (3), $R^5$ is a $C_2$-$C_{15}$, preferably $C_3$-$C_{12}$ divalent hydrocarbon group which may contain nitrogen. Examples of $R^5$ include groups having the formulae (4-1) to (4-11).

$-CH_2-CH_2-$ (4-1)

$-CH_2-CH_2-CH_2-$ (4-2)

$-CH_2-CH_2-CH_2-CH_2-$ (4-3)

$-CH_2-C_6H_4-$ (4-4)

$-CH_2-C_6H_4-CH_2-$ (4-5)

$-CH_2-CH_2-C_6H_4-$ (4-6)

$-CH_2-CH_2-C_6H_4-CH_2-$ (4-7)

$—CH_2—CH_2—C_6H_4—CH_2—CH_2—$ (4-8)

$—CH_2—CH_2—NH—CH_2—CH_2—$ (4-9)

$—CH_2—CH_2—NH—CH_2—CH_2—CH_2—$ (4-10)

$—CH_2—C_6H_4—CH_2—NH—CH_2—CH_2—CH_2—$ (4-11)

The orientation of an alkylene group attached to a phenylene group may be ortho, meta or para. Of these, groups (4-2) and (4-10) are preferred, with the group (4-2) being most preferred.

Another example of component (D) is an amino group containing hydrolyzable organosilane having a divalent basic site A, represented by the general formula (5), and/or a partial hydrolytic condensate thereof.

$A{=}N—B—SiZ_3$ (5)

In formula (5), the divalent basic site A is a $C_1$-$C_{15}$ divalent hydrocarbon group containing at least 2, preferably 2 to 5, more preferably 2 to 4 nitrogen atoms in its structure. The monovalent group containing basic site A, represented by the formula: A=N— is, for example, a group in the form of a partial structure of 1,5,7-triazabicyclo[4,4,0]dec-5-ene represented by the following formula (6). Examples of the basic site A, i.e., divalent group: A=include strongly basic groups such as a N-substituted or unsubstituted guanidyl group represented by the following formula (7). It is noted that the wavy line in formula (6) designates a point of attachment to B, and the wavy line in formula (7) designates a point of attachment to the nitrogen atom.

[Chem. 6]

(6)

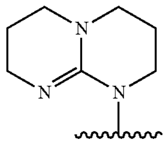

[Chem. 7]

(7)

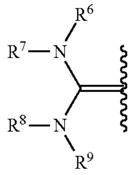

In formula (7), $R^6$ to $R^9$ each are hydrogen or a $C_1$-$C_{10}$ straight, branched or cyclic alkyl, alkenyl, or aryl group. Examples include alkyl groups such as methyl, ethyl, propyl, isopropyl, butyl, isobutyl, sec-butyl, tert-butyl, pentyl, and hexyl, cycloalkyl groups such as cyclohexyl, alkenyl groups such as vinyl and allyl, and aryl groups such as phenyl and naphthyl. Inter alia, methyl, ethyl and phenyl are preferred, with methyl being most to preferred. $R^6$ to $R^9$ may be the same or different.

In formula (5), Z is a $C_1$-$C_6$, preferably $C_1$-$C_4$ hydrolyzable group (i.e., group capable of bonding to a silicon atom to form a Si—O—C linkage) selected from alkoxy groups such as methoxy, ethoxy, propoxy, isopropoxy, butoxy, isobutoxy, and tert-butoxy, alkenyloxy groups such as vinyloxy, allyloxy, propenoxy, and isopropenoxy, ketoxime groups such as dimethylketoxime, diethylketoxime, and methylethylketoxime, and acyloxy groups such as acetoxy, or at least one monovalent group selected from $C_1$-$C_6$, preferably $C_1$-$C_4$ monovalent hydrocarbon groups, for example, alkyl groups such as methyl and ethyl, alkenyl groups such as vinyl, and aryl groups such as phenyl. At least two of three silicon-bonded Z are hydrolyzable groups, preferably all three being hydrolyzable groups.

Examples of the hydrolyzable silyl group: $—SiZ_3$ include alkoxysilyl groups such as trimethoxysilyl, methyldimethoxysilyl, vinyldimethoxysilyl, phenyldimethoxysilyl, and triethoxysilyl, isopropenoxysilyl groups such as triisopropenoxysilyl, methyldiisopropenoxysilyl, ethyldiisopropenoxysilyl, vinyldiisopropenoxysilyl, and phenyldiisopropenoxysilyl, ketoximesilyl groups such as tris(dimethylketoxime)silyl, tris(diethylketoxime)silyl, and tris(ethylmethylketoxime)silyl. Inter alia, trimethoxysilyl and triethoxysilyl are preferred.

In formula (5), B is a $C_1$-$C_{10}$, preferably $C_1$-$C_6$, more preferably $C_2$-$C_4$ unsubstituted or substituted divalent hydrocarbon group which may contain a heteroatom such as oxygen or nitrogen, for example, a straight, branched or cyclic alkylene, alkenylene or arylene group or a combination thereof. Examples include alkylene groups such as methylene, ethylene, propylene, tetramethylene, hexamethylene, octamethylene, decamethylene, and 2-methylpropylene, arylene groups such as phenylene, combinations of an alkylene group with an arylene group, and alkylene groups separated by ketone, ester or amide. Inter alia, methylene, ethylene, propylene, and propylene separated by an amide bond are preferred, with propylene being most preferred.

Examples of the hydrolyzable amino-containing organosilane having formula (5) include compounds of the general formulae (8-1) to (8-5). Herein Me, Et, and Ph stand for methyl, ethyl, and phenyl, respectively.

[Chem. 8]

(8-1)

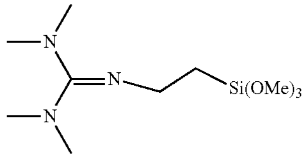

[Chem. 9]

(8-2)

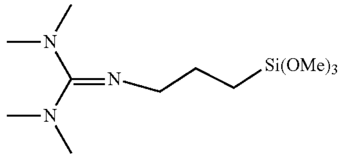

[Chem. 10]

(8-3)

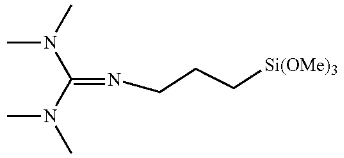

-continued

[Chem. 11]

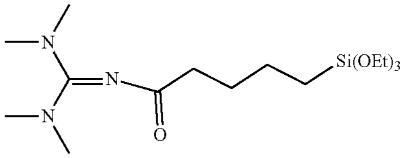

(8-4)

[Chem. 12]

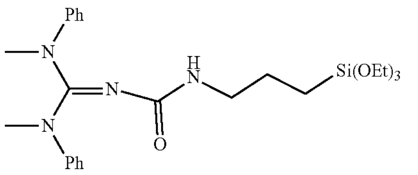

(8-5)

Other examples of the amino group containing hydrolyzable organosilane having formula (5) include trimethoxysilane and triethoxysilane having a terminally amino-functionality-substituted alkyl group such as a propyl group which is terminally substituted with a partial structure of 1,5,7-triazabicyclo[4,4,0]dec-5-ene represented by formula (6) as the monovalent group: A=N—.

Of these, preference is given to N-methyl-substituted guanidyl-containing trialkoxysilanes, for example, N-methyl-substituted guanidyl-containing trimethoxysilanes, e.g., γ-(N,N'-dimethylguanidyl)propyltrimethoxysilane, as represented by formulae (8-1) and (8-2), especially (8-2).

Component (D) may be used alone or in admixture.

The amount of the amino group containing hydrolyzable organosilane and/or partial hydrolytic condensate thereof blended as component (D) is 0.5 to 5 parts by weight, preferably 0.5 to 3 parts by weight, more preferably 0.5 to 2 parts by weight per 100 parts by weight of component (A). When the amount of component (D) is less than 0.5 part by weight, the reactivity of component (A) with component (C) becomes low, failing to obtain the desired cured product and detracting from adhesion. When the amount of component (D) exceeds 5 parts by weight, there arises a drawback that the composition may lose economy or storage stability.

[Component (E)]

The RTV organopolysiloxane composition may further contain (E) an organic solvent. Component (E) is a solvent for dissolving component (A). Examples include alcohols such as ethanol, isopropanol, butanol, and cyclohexanol, ketones such as acetone, ethyl methyl ketone, and methyl isobutyl ketone, ethers such as tetrahydrofuran and furan, and hydrocarbons such as cyclohexane, methylcyclohexane, ethylcyclohexane, and low-boiling isoparaffin. Although aromatic compounds such as benzene, toluene and xylene are known as common organic solvents, their use is avoided at the present because they are toxic to the human body and detrimental to the environment. In particular, toluene is a designated dangerous drug in Japan, its management concentration is as low as 20 ppm, and it is known as a substance to be strictly managed. Accordingly, the inventive composition is preferably free of aromatic compounds such as benzene, toluene and xylene.

Among the above-exemplified solvents, low-boiling isoparaffin solvents having low odor, high solubility and minimal environmental load are preferred, for example, Isopar C and Isopar E (Exxon Mobil Corp.), with Isopar E being most preferred.

In the RTV organopolysiloxane composition, component (E) preferably has a boiling point in the range of 40 to 180° C. A solvent having a boiling point of lower than 40° C. is highly volatile and more dangerous and allows the RTV organopolysiloxane composition to fast cure, adversely affecting working efficiency. A solvent having a boiling point in excess of 180° C. is low volatile and may retard cure.

Component (E) is preferably added in such an amount that the RTV organopolysiloxane composition may have a non-volatile content of 20 to 80% by weight. A non-volatile content of less than 20% by weight indicates that more component (E) must be volatilized, which is disadvantageous in view of atom economy. A non-volatile content in excess of 80% by weight adversely affects the solubility of component (A), making it difficult to prepare the RTV organopolysiloxane composition.

[Other Components]

Besides the foregoing components, the RTV organopolysiloxane composition may contain a filler and additives, if necessary, as long as the objects of the invention are not compromised. Suitable fillers include ground silica, fumed silica, calcium carbonate, zinc carbonate, aluminum hydroxide, aluminum hydroxide oxide, alumina, magnesium oxide, and wet silica. Additives include well-known additives, for example, wetters or thixotropic agents such as polyethers, plasticizers, and non-reactive dimethylsilicone oil. Further, there may be added coloring agents such as pigments and dyes, fluorescent brighteners, mildew-proofing agents, antibacterial agents, bleed oils such as non-reactive phenylsilicone oil, and surface modifiers such as fluorosilicone oil and silicone-incompatible organic liquids, if necessary.

The RTV organopolysiloxane composition is prepared by mixing the foregoing components in a standard way, and stored in a moisture-proof atmosphere. When it is allowed to stand at room temperature (23° C.±15° C.), it cures in the presence of airborne moisture typically within 5 minutes to 1 week.

It is preferred that the RTV organopolysiloxane composition have a viscosity at 23° C. of 10 to 5,000 mPa·s, especially 20 to 3,000 mPa·s.

The RTV organopolysiloxane composition undergoes curing reaction in a stable manner to form a cured film having a high hardness even when it does not contain metal compounds having a condensation catalyzing effect (i.e., metal base condensation catalysts) which are commonly used in condensation cure type compositions, such as organic lead compounds, organic tin compounds and organic titanium compounds.

The RTV organopolysiloxane composition is simple to prepare and inexpensive, and forms a cured product or coating film (conformal coating film) having a high hardness to despite omission of metal compounds. The composition is suited in applications as coating and sealing compositions, especially as coating materials (conformal coating materials) for electric/electronic parts and substrates thereof and sealing materials for liquid crystal display devices.

The invention also provides an article which is coated or sealed with a cured product of the RTV organopolysiloxane composition.

Examples of the article to which the invention is applied include automobile parts (on-board parts), automobile oil seals, electric/electronic parts and substrates thereof, liquid crystal display devices, electric conductors and cables, building structures, and structures in civil engineering works.

EXAMPLES

Examples and Comparative Examples are given below for illustrating the invention although the invention is not limited thereto. In Examples, Me stands for methyl, the viscosity is measured at 23° C. by a rotational viscometer, and the molecular weight is a number average molecular weight measured by GPC versus polystyrene standards using toluene as developing solvent.

Example 1

A composition 1 was obtained by mixing 92 parts by weight of a resinous siloxane copolymer consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E (Exxon Mobil Corp., b.p. 115-140° C., the same holds true, hereinafter) to a solid content of 60 wt % as component (A), 10 parts by weight (to give a molar ratio of component (B) to silanol groups in component (A) of 0.74) of ethoxymethyltriethoxysilane as component (B), 40 parts by weight of dimethylpolysiloxane to polymer capped at both ends of the molecular chain with hydroxysilyl groups and having a viscosity of 700 mPa·s at 23° C. and a degree of polymerization of ~270 as component (C), and 1 part by weight of γ-aminopropyltriethoxysilane as component (D) at room temperature (23° C., the same holds true, hereinafter) for 30 minutes.

Example 2

A composition 2 was obtained by mixing 92 parts by weight of a resinous siloxane copolymer consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 8 parts by weight (to give a molar ratio of component (B) to silanol groups in component (A) of 0.59) of ethoxymethyltriethoxysilane as component (B), 30 parts by weight of dimethylpolysiloxane polymer capped at both ends of the molecular chain with hydroxysilyl groups and having a viscosity of 5,000 mPa·s at 23° C. and a degree of polymerization of ~389 as component (C), and 1 part by weight of γ-aminopropyltriethoxysilane as component (D) at room temperature for 30 minutes.

Example 3

A composition 3 was obtained by mixing 92 parts by weight of a resinous siloxane copolymer consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 8 parts by weight (to give a molar ratio of component (B) to silanol groups in component (A) of 0.59) of ethoxymethyltriethoxysilane as component (B), 30 parts by weight of dimethylpolysiloxane polymer capped at both ends of the molecular chain with hydroxysilyl groups and having a viscosity of 5,000 mPa·s at 23° C. and a degree of polymerization of ~389 as component (C), and 0.3 part by weight of γ-aminopropyltriethoxysilane as component (D) at room temperature for 30 minutes.

Example 4

A composition 4 was obtained by mixing 92 parts by weight of a resinous siloxane copolymer consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 8 parts by weight (to give a molar ratio of component (B) to silanol groups in component (A) of 0.59) of ethoxymethyltriethoxysilane as component (B), 30 parts by weight of dimethylpolysiloxane polymer capped at both ends of the molecular chain with hydroxysilyl groups and having a viscosity of 5,000 mPa·s at 23° C. and a degree of polymerization of ~389 as component (C), and 0.3 part by weight of γ-(N,N'-dimethylguanidyl)propyltrimethoxysilane as component (D) at room temperature for 30 minutes.

Example 5

A composition 5 was obtained by mixing 92 parts by weight of a resinous siloxane copolymer consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 8 parts by weight (to give a molar ratio of component (B) to silanol groups in component (A) of 0.59) of ethoxymethyltriethoxysilane as component (B), 30 parts by weight of dimethylpolysiloxane polymer capped at both ends of the molecular chain with hydroxysilyl groups and having a viscosity of 5,000 mPa·s at 23° C. and a degree of polymerization of ~389 as component (C), and 0.8 part by weight of γ-aminopropyltriethoxysilane and 0.1 part by weight of γ-(N,N'-dimethylguanidylipropyltrimethoxysilane as component (D) at room temperature for 30 minutes.

Comparative Example 1

A composition 6 was obtained by mixing 92 parts by weight of a resinous siloxane copolymer consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 10 parts by weight (to give a molar ratio of component (B) to silanol groups in component (A) of 0.74) of ethoxymethyltriethoxysilane as component (B), and 40 parts by weight of dimethylpolysiloxane polymer capped at both ends of the molecular chain with hydroxysilyl groups and having a viscosity of 700 mPa·s at 23° C. and a degree of polymerization of ~270 as component (C) at room temperature for 30 minutes.

Comparative Example 2

A composition 7 was obtained by mixing 92 parts by weight of a resinous siloxane copolymer consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 10 parts by weight (to give a molar ratio of component (B) to silanol groups in component (A) of 0.74) of ethoxymethyltriethoxysilane as component (B), and 40 parts by weight of dimethylpolysiloxane polymer capped at both ends of the molecular chain with hydroxysilyl groups and having a viscosity of 5,000 mPa·s as 23° C. and a degree of polymerization of ~389 as component (C) at room temperature for 30 minutes.

Comparative Example 3

A composition 8 was obtained by mixing 92 parts by weight of a resinous siloxane copolymer consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 10 parts by weight (to give a molar ratio of component (B) to silanol groups in component (A) of 0.74) of ethoxymethyltriethoxysilane as component (B), and 1 part by weight of γ-aminopropyltriethoxysilane as component (D) at room temperature for 30 minutes.

Comparative Example 4

A composition 9 was obtained by mixing 92 parts by weight of a resinous siloxane copolymer consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 2 parts by weight (to give a molar ratio of component (B) to silanol groups in component (A) of 0.15) of ethoxymethyltriethoxysilane as component (B), 30 parts by weight of dimethylpolysiloxane polymer capped at both ends of the molecular chain with hydroxysilyl groups and having a viscosity of 5,000 mPa·s at 23° C. and a degree of polymerization of ~389 as component (C), and 1 part by weight of γ-aminopropyltriethoxysilane as component (D) at room temperature for 30 minutes.

Comparative Example 5

A composition 10 was obtained by mixing 92 parts by weight of a resinous siloxane copolymer consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 10 parts by weight (to give a molar ratio of vinyltriisopropenoxysilane to silanol groups in component (A) of 0.72) of vinyltriisopropenoxysilane instead of component (B), and 0.8 part by weight of γ-aminopropyltriethoxysilane as component (D) at RT for 30 minutes. Then, 60 parts by weight of dimethylpolysiloxane polymer capped at both ends of the molecular chain with hydroxysilyl groups and having a viscosity of 700 mPa·s at 23° C. and a degree of polymerization of ~270 as component (C) was mixed at RT for 40 minutes. Finally, 1 part by weight of γ-(N,N'-dimethylguanidyl)propyltrimethoxysilane as component (D) was mixed at room temperature for 30 minutes.

Compositions 1 to 10 thus prepared were determined for the following properties. The results are shown in Tables 1 and 2 together with the preparation time of the compositions.

Viscosity and Initial Cure

Compositions 1 to 10 were measured for viscosity in a 23° C./50% RH environment. As initial cure, Compositions 1 to 10 were allowed to stand in a 23° C./50% RH environment for 7 days during which the composition cured to a thickness of 3 mm. Hardness was measured by Durometer Type A according to JIS K 6249.

Storage Stability

Each of Compositions 1 to 10 was placed in a sealable container whereupon it was allowed to stand in a 23° C./50% RH environment for 6 months. After the lapse of 6 months, each of Compositions 1 to 10 was allowed to stand in a 23° C./50% RH environment for 7 days during which the composition cured to a thickness of 3 mm. Hardness was measured by Durometer Type A according to JIS K 6249. The sample was judged good when the hardness was within ±5 in comparison with the initial hardness and poor when the hardness was outside ±5.

TABLE 1

| | Example 1 Composition 1 | Example 2 Composition 2 | Example 3 Composition 3 | Example 4 Composition 4 | Example 5 Composition 5 |
|---|---|---|---|---|---|
| Viscosity (mPa · s) | 346 | 370 | 250 | 454 | 546 |
| Hardness (Type A) | 67 | 78 | 71 | 83 | 82 |
| Storage | Good | Good | Good | Good | Good |
| Composition preparation or mixing time (min) | 30 min | 30 min | 30 min | 30 min | 30 min |

TABLE 2

| | Comparative Example 1 Composition 6 | Comparative Example 2 Composition 7 | Comparative Example 3 Composition 8 | Comparative Example 4 Composition 9 | Comparative Example 5 Composition 10 |
|---|---|---|---|---|---|
| Viscosity (mPa · s) | 52 | 132 | 10 | 421 | 100 |
| Hardness (Type A) | Unmeasurable (did not cure) | Unmeasurable (did not cure) | Unmeasurable | 71 | 67 |
| Storage | Unmeasurable (did not cure) | Unmeasurable (did not cure) | Unmeasurable | Poor | Good |
| Composition preparation or mixing time (min) | 30 min | 30 min | 30 min | 30 min | 120 min |

Compositions 6 and 7 which were free of component (D), when allowed to stand in a 23° C./50% RH environment for 7 days so as to cure to a thickness of 3 mm, turned to a viscous fluid and could not be measured for hardness.

Composition 8 which was free of component (C) remained liquid without cure, and when allowed to stand over a long term, precipitated as powder.

Composition 9 wherein the molar ratio of component (B) to silanol groups in component (A) is outside the range of the invention showed a satisfactory cure behavior, but experienced a hardness lowering and a viscosity buildup in the storage test.

Composition 10 is a RTV organopolysiloxane composition of deacetonation type prepared by the method of Patent Document 4 (JP 6319168). Despite satisfactory hardness and storage stability, this method is not regarded the simple preparation method as desired herein because three steps must be involved so that the preparation process is cumbersome and the preparation or mixing time is long.

In contrast, Compositions 1 to 5 of Examples wherein components (A) to (D) are blended in specific amounts are simple to prepare and inexpensive, show a stable cure behavior even when metal compounds or condensation catalysts are not contained, and are satisfactory in hardness and storage stability.

The invention claimed is:

1. A room-temperature-vulcanizing organopolysiloxane composition comprising components (A) to (D):

(A) 100 parts by weight of an organopolysiloxane resin of three-dimensional network structure comprising $R_3SiO_{1/2}$ units and $SiO_{4/2}$ units wherein R is independently an unsubstituted or substituted $C_1$-$C_6$ monovalent hydrocarbon group or hydroxy group, in a molar ratio of $R_3SiO_{1/2}$ units to $SiO_{4/2}$ units of from 0.5 to 1.5, optionally comprising $R_2SiO_{2/2}$ units and $RSiO_{3/2}$ units wherein R is as defined above in an each molar ratio of $R_2SiO_{2/2}$ units to $SiO_{4/2}$ units and $RSiO_{3/2}$ units to $SiO_{4/2}$ units independently of from 0 to 1.0, the resin containing 0.005 to 0.15 mol/100 g of silicon-bonded hydroxy groups or silanol groups, and having a molecular weight of 2,000 to 10,000, (B) a hydrolyzable organosilane compound having the general formula (1):

(1)

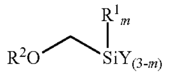

wherein $R^1$ is independently an unsubstituted or substituted $C_1$-$C_{12}$ monovalent hydrocarbon group, $R^2$ is an unsubstituted or substituted $C_1$-$C_{12}$ monovalent hydrocarbon group, Y is a hydrolyzable group, and m is 0, 1 or 2, and/or a partial hydrolytic condensate thereof in such an amount as to give a molar ratio of component (B) to silanol groups in component (A) of from 0.2 to 1, (C) 10 to 100 parts by weight of a linear diorganopolysiloxane which is capped at both ends of the molecular chain with a silanol group, and (D) 0.5 to 5 parts by weight of an amino group containing hydrolyzable organosilane and/or a partial hydrolytic condensate thereof other than components (A) and (B).

2. The room-temperature-vulcanizing organopolysiloxane composition of claim 1, further comprising (E) an organic solvent having a boiling point of 40 to 180° C., exclusive of benzene, toluene and xylene, in such an amount that the composition may have a non-volatile content of 20 to 80% by weight.

3. The room-temperature-vulcanizing organopolysiloxane composition of claim 1 which is free of a metal base condensation catalyst.

4. The room-temperature-vulcanizing organopolysiloxane composition of claim 1 which is used for coating electric/electronic parts and/or substrates thereof.

5. The room-temperature-vulcanizing organopolysiloxane composition of claim 1 which is used for sealing liquid crystal display devices.

6. An article which is coated or sealed with a cured product of the room-temperature-vulcanizing organopolysiloxane composition of claim 1.

7. The room-temperature-vulcanizing organopolysiloxane composition of claim 2 which is free of a metal base condensation catalyst.

8. An article which is coated or sealed with a cured product of the room-temperature-vulcanizing organopolysiloxane composition of claim 2.

9. An article which is coated or sealed with a cured product of the room-temperature-vulcanizing organopolysiloxane composition of claim 3.

* * * * *